Aug. 28, 1951  F. W. BARKER  2,565,466
KNOCKDOWN SHOVEL
Filed April 2, 1947
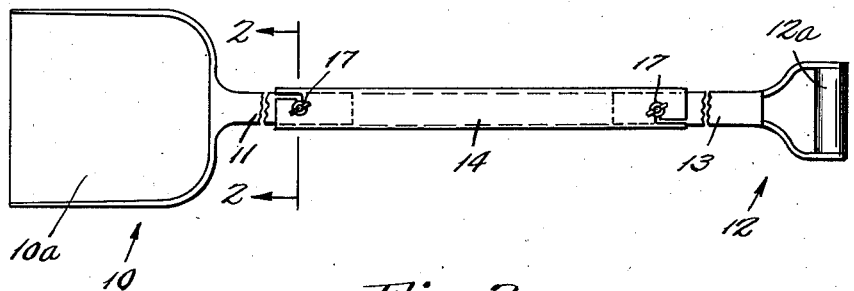
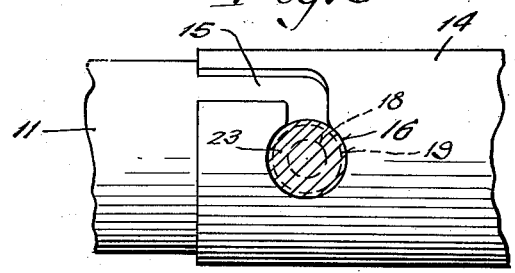
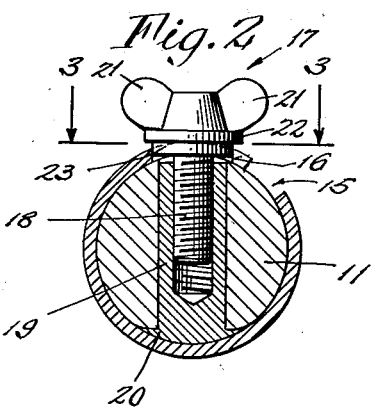
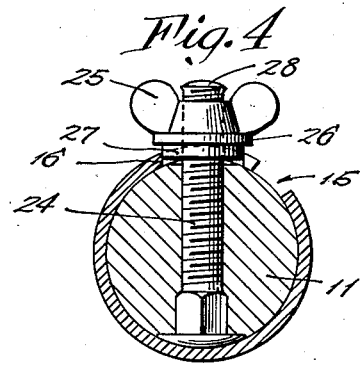
INVENTOR.
Frederick W. Barker
BY
Johnson and Kline
ATTORNEYS Patented Aug. 28, 1951

2,565,466

UNITED STATES PATENT OFFICE 2,565,466

KNOCKDOWN SHOVEL

Frederick W. Barker, Poundridge, N. Y.

Application April 2, 1947, Serial No. 738,850

1 Claim. (Cl. 294—57)

This invention relates to knock-down shovels and like implements wherein there are separable sections enabling the shovels or implements to be dismantled so as to have a more compact form when not in use.

An object of the invention is to provide an improved knock-down shovel or the like which is adapted to be carried in a car for emergency use, and which is extremely sturdy and rigid when assembled, the shovel having sections which are positively locked together when in assembled position and yet are quickly and conveniently separable, and attachable to each other.

Another object of the invention is to provide an improved knock-down tool as above, which is formed of few and simple parts, and is extremely economical to manufacture.

In accomplishing these objects there is provided, in the embodiments of the invention illustrated herein, an improved shovel having separate blade and handle sections, and having an intermediate connector section which telescopically fits the blade and handle sections. The connector section, which is preferably tubular, has bayonet slots at its ends and the blade and handle sections have screw means which are cooperable with the bayonet slots and which in addition may be tightened so as to clamp together the telescoping sections. By this organization the sections are not only locked, one to the other, but also securely clamped together against relative movement or looseness, and therefore an extremely rigid and sturdy overall assemblage is provided. In addition, the bayonet slots are enlarged at their inner ends and projections are provided on the screw means, adapted to fit the enlarged ends of the slots whereby a further locking action is had, preventing relative turning of the sections even if the screw means should become partially loosened. This is of considerable advantage in an implement such as a shovel, since at times the implement may be used in a manner which imposes considerable twisting on the shank or stem.

In the accompanying drawings:

Figure 1 is a plan view of an improved knockdown shovel made in accordance with the invention.

Fig. 2 is a transverse section taken on the line 2—2 of Fig. 1.

Fig. 3 is a fragmentary view partly in elevation and partly in section, taken on the line 3—3 of Fig. 2, and Fig. 4 is a view like Fig. 2 but showing a modification of the invention.

Referring to Figs. 1, 2 and 3, the shovel shown comprises a blade section 10 including a blade 10a which may have any desired or suitable shape, the said blade being carried by a shank 11 which is preferably of generally cylindrical shape. The shovel has a handle section 12 including a handle 12a of suitable shape, secured to a generally cylindrical shank 13 which latter is preferably of the same diameter as the shank 11.

Connecting the shanks 11 and 13 together in longitudinally spaced relationship is an intermediate tubular section 14 which at its ends telescopically receives the shanks.

The sections 10, 12 and 14 are quickly and easily separable from each other so that the shovel when not in use may be made extremely compact so as to occupy but little space, thereby adapting it to be carried in automobiles and the like for emergency use, as for example to dig out a car stalled in deep snow.

In accordance with the invention, improved means are provided for clamping and locking together the shovel sections 10, 12 and 14, so as to form these into a sturdy and rigid unit or assemblage, the said means enabling the sections to be quickly and conveniently assembled or separated from each other, and having few and simple, economically producable components or parts.

In accomplishing this, the ends of the connector section 14 are provided with bayonet slots 15, the inner ends 16 of which are enlarged and are of circular configuration. Cooperable with the edge portions of the bayonet slots 15 are wing screws 17, the shanks 18 of which are threaded into bushings 19 embedded in the shanks 11 and 13 and having heads 20 which securely prevent pull-out of the bushings from the shanks.

Under the wings 21 of each of the wing screws 17, concentric circular enlargements or washers 22 and 23 of different diameters are provided, the enlargement 22 being located next to the wings 21 and the enlargement 23 being next to the threaded shank 18. The diameter of the enlargement 23 is slightly smaller than the diameter of the circular end of the bayonet slot 15, so that the enlargement may project into and fit the end of the slot. Also, since the enlargement 22 is larger than the circular end 16 of the bayonet slot, the enlargement will overlie the edge portions of the end of said slot and clamp against said portions.

When it is desired to assemble or dismantle the shovel of this invention, it is merely necessary to loosen the wing screws 17, whereupon the shanks 11 and 13 may be inserted in or removed from the intermediate tubular section 14.

When assembling the shovel and after the shanks 11 and 13 have been inserted in the section 14, the wing screws 17 are tightened, causing the enlargements or projections 23 thereof to enter the enlarged ends 16 of the bayonet slots, and causing the enlargements 22 to clamp the surrounding edge portions of the intermediate section 14. It will be noted that the enlargements 23 securely lock the shanks 11 and 13 to the section 14 even though the wing screws 17 may not be absolutely tight, and this is especially advantageous in a shovel, for example, where the shank or stem is subjected to considerable twisting force at times.

By virtue of the clamping action effected by the enlargements 22 of the wing screws 17 on the edge portions of the section 14 a rigid assemblage is provided which prevents looseness of the joined sections and provides for a rigid overall assembly. Actually the screws 17 and bushings 19 clamp together the sections 10, 12 and 14, since tightening of the wing screws 17 causes the shanks 11 and 13 to be tightly clamped between the heads 20 of the bushings and the opposite portions of the tubular section 14.

A modification of the invention is shown in Fig. 4, wherein the shank 11 is shown as carrying a carriage bolt 24 which passes through it and which takes a wing nut 25 having disk-like enlargements 26 and 27. The enlargements 26 and 27 function similarly to the enlargements 22 and 23 of the wing screw 17, the enlargement 27 occupying the enlarged end 16 of the bayonet slot 15, and the enlargement 26 clamping the portions of the connector section 14 surrounding the said slot.

If desired, the end 28 of the bolt 24 may be mushroomed as shown to prevent the nut 25 from becoming lost when loose on the bolt.

Variations and modifications can be made within the scope of this invention, and portions of the improvements may be used without others.

I claim:

A knock-down shovel consisting of three pieces each of which occupies a substantial fraction of the length of the assembled shovel, the first of said pieces being a shaft member having similar hollow end portions provided with bayonet slots, the second of said pieces being a shovel bit having a shank receivable in either of said end portions, and the third of said pieces being a handle member also having a shank receivable in either of said end portions and having a handle the axis of which is perpendicular to said shank; a projecting threaded clamping member associated with each of said shanks and receivable in either of said slots, said projecting members being so related to said shanks and said slots being so related to said end portions that when said parts are fully assembled in either way, the plane of operation defined by said shovel bit is substantially parallel to said handle axis.

FREDERICK W. BARKER.

REFERENCES CITED

The following references are of record in the file of this patent:

UNITED STATES PATENTS

| Number | Name | Date |
|---|---|---|
| 208,749 | McCann | Oct. 8, 1878 |
| 883,702 | Ellison | Apr. 7, 1908 |
| 1,310,134 | Poston | July 15, 1919 |

FOREIGN PATENTS

| Number | Country | Date |
|---|---|---|
| 114,267 | Great Britain | Mar. 28, 1918 |
| 245,076 | Italy | Feb. 18, 1926 |